Aug. 12, 1924.

G. R. RODDY

CONVEYER CHAIN

Filed Jan. 19, 1923

Inventor

Gustav R. Roddy

By John S. Barker

Attorney

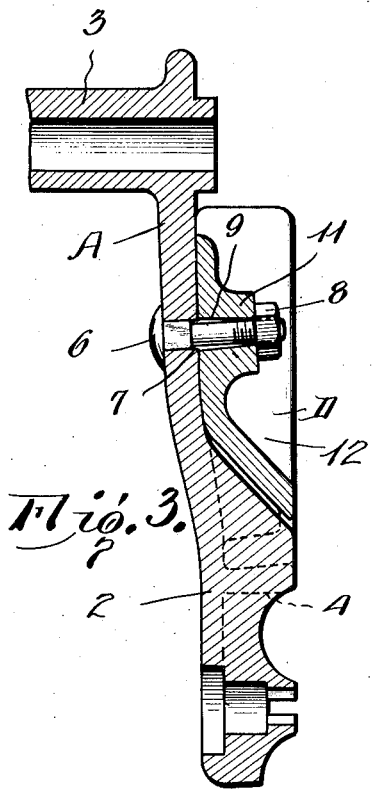
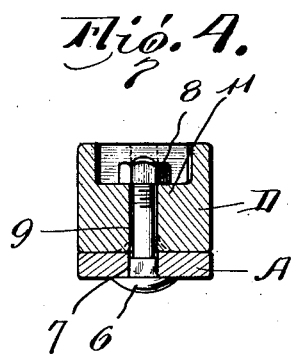
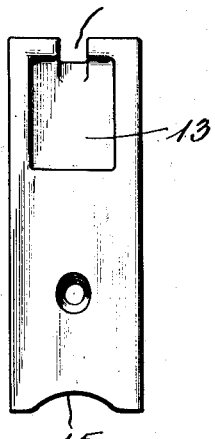
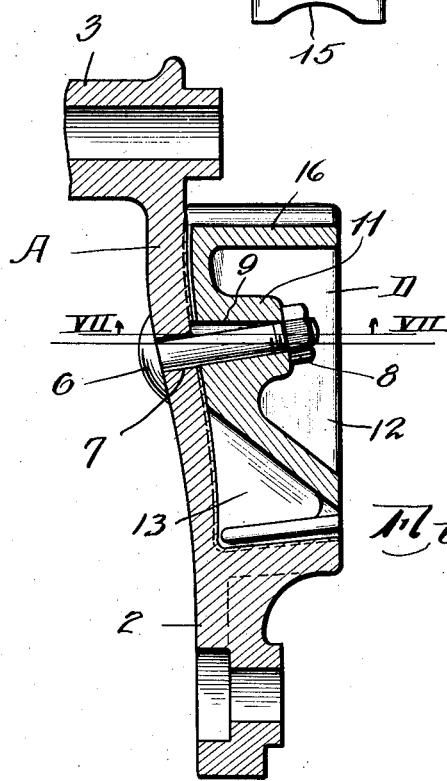
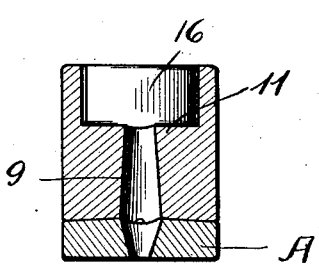

Patented Aug. 12, 1924.

1,504,646

UNITED STATES PATENT OFFICE.

GUSTAV R. RODDY, OF MILWAUKEE, WISCONSIN, ASSIGNOR TO CHAIN BELT COMPANY, OF MILWAUKEE, WISCONSIN, A CORPORATION OF WISCONSIN.

CONVEYER CHAIN.

Application filed January 19, 1923. Serial No. 613,720.

*To all whom it may concern:*

Be it known that I, GUSTAV R. RODDY, a citizen of the United States, residing at Milwaukee, in the county of Milwaukee and State of Wisconsin, have invented certain new and useful Improvements in Conveyer Chains, of which the following is a specification.

My invention relates to drag conveyer chains, that is, conveyer chains that are adapted to run in the bottoms of troughs into which material to be moved is dumped. In using drag chains to convey material of a gritty or abrasive nature, such as cement, for instance, experience has proven that the side and cross or end bars of the links are rapidly cut out and worn away by the abrasive material conveyed. This destructive action takes place so rapidly that the parts of the chain which are in engagement with the bottom of the trough are frequently worn to such extent as to expose the connecting pintles long before the pintles wear in their seats to any considerable degree. This is not usual in the ordinary use of conveyer chains, which, under most conditions, show the greatest wear at the joints and parts of articulation, the connecting pintles being the first elements of the links to need replacement.

My invention has for its object to provide a drag chain with detachable wearing shoes adapted to rest upon the bottom of the trough in which the conveyer moves and to largely take the destructive wear above indicated. The chain is thus relieved and its life materially lengthened, for, if desired, the wearing shoes may be replaced from time to time as they wear away. These wearing shoes are made of metal harder than that which enters into the composition of the links of the chain, and this is one of the reasons why such shoes are detachable from the links rather than integral therewith; for in the manufacture of cast conveyer chain links it is common practice to anneal the links after they are cast, and this makes it impracticable to use a very hard iron for the links, such for instance as white iron, the material of which I prefer to form the shoes.

In the accompanying drawings—

Fig. 3 is a longitudinal sectional view on the line III—III of Fig. 2.

Fig. 4 is a transverse sectional view on the line IV—IV of Fig. 2.

Fig. 5 is an inside view of the wearing shoe.

Fig. 6 is a longitudinal sectional view through a side bar of a chain link to which is applied a wearing shoe of a different construction than that illustrated in the other views.

Fig. 7 is a transverse sectional view on the line VII—VII of Fig. 6.

Figure 1:
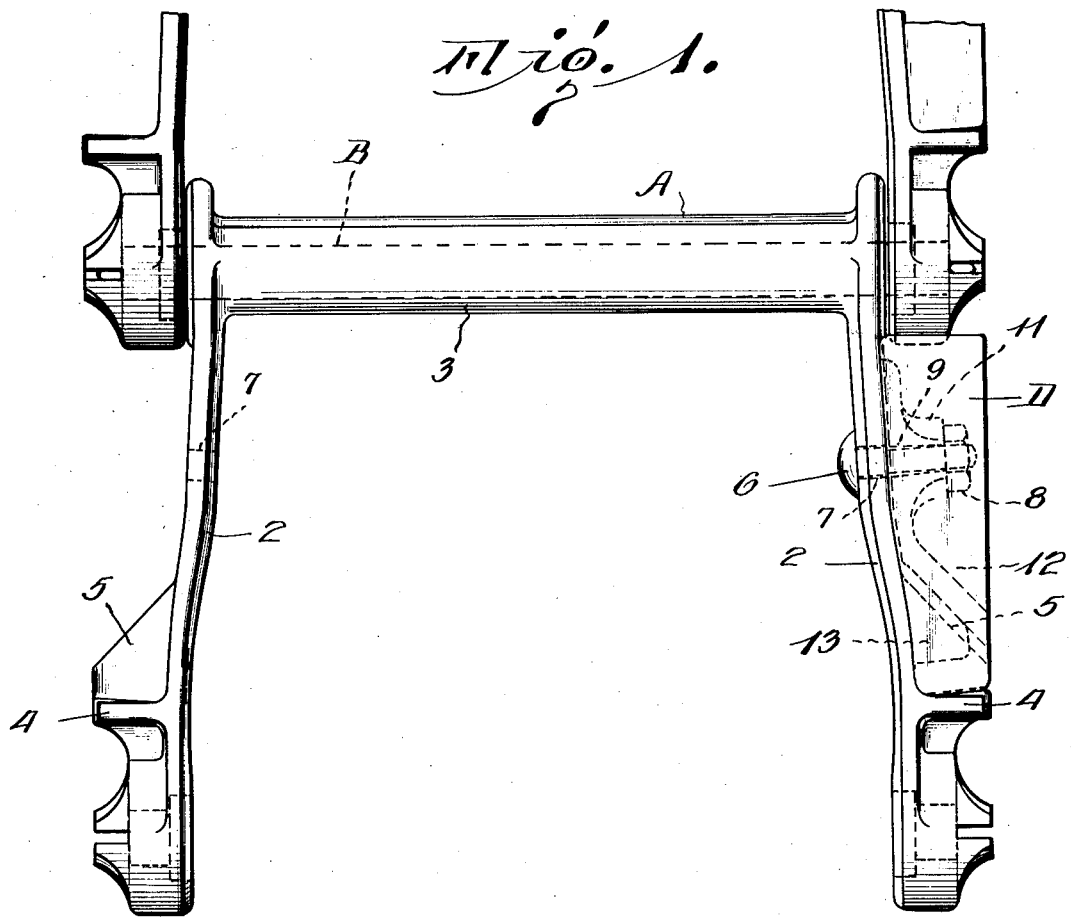
Figure 1 is a plan view of a short section of conveyer drag chain to which my invention is applied, one side bar of the full link represented being provided with a wearing shoe, while from the other side bar the shoe has been removed.
Figure 2:
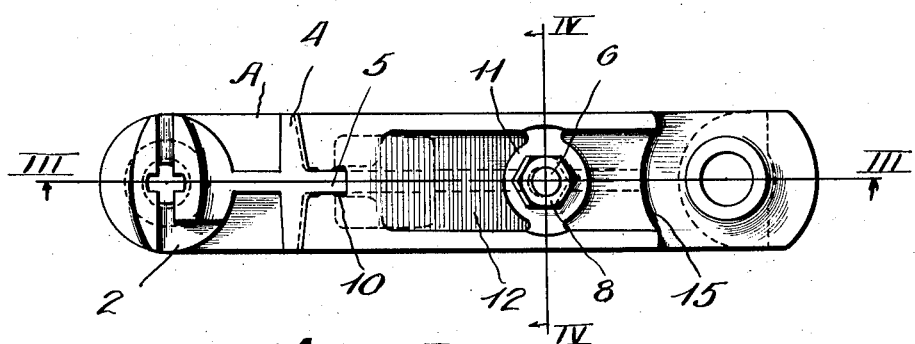
Fig. 2 is a side elevation of a link to which the wearing shoe is applied.

In the accompanying drawings A designates the link of a drag chain. It is of well known form, and in practice is made of cast iron and is annealed before being put into use to make it malleable. A series of these links united by pintles B constitute a chain. The pintles pass through the overlapping ends of the side bars 2 and through the hollow transverse connecting bars 3, which unite the side bars at one end of each link. The side bars are represented as being provided with laterally extending conveying wings 4, preferably of such length that their outer edges extend slightly beyond the parts of the chain at the joints thereof. In use the edges of the side and connecting bars on one face of the chain, rest upon the bottom of a trough in which the chain is adapted to move and into which the material to be conveyed is dumped. The outer edges of the wings are adapted to run close to the side walls of the trough. In the form of chain illustrated the wings 4 are united with the side bars by strengthening webs 5.

D represents a wearing block which is separable from the chain link and is secured to a side bar thereof, preferably to its outer face. Each side bar of each link is preferably provided with one of the wearing blocks. These are formed of harder metal than that of which the links are composed, ordinary white iron being found very suitable for this purpose. A single bolt 6 is employed to unite each wearing block to the side bar of a link. The bolt passes through an aperture 7 in the side bar, shaped to fit the bolt, and prevent the latter from rotating as the securing nut 8 is screwed tightly into position to hold the wearing block. An aperture 9 is formed in the wearing block for the bolt. In order to assist in holding the wearing block in working position on the side bar, one end thereof may be slotted, as at 10, so that it may straddle the web 5. This prevents the block from turning upon the bolt and holds its sides parallel with the edges of the side bar and in working position. The aperture 9 is surrounded by a boss of metal 11 to give to the bolt 6 a substantial and strong bearing. One end of the block is shaped to bear against the wing 4, while the other end may be curved, as at 15, to allow free movement of the end of the side bar of the link pivotally united with the one carrying the block. The block may be chambered as at 12 and 13 to reduce metal and weight.

In Figs. 6 and 7 is shown a form of block in which there is a cross end wall 16 at the curved end of the block which tends to prevent material collecting in the recess 12 surrounding the boss through which passes the securing bolt 6.

The blocks shown in Figs. 1 and 5, inclusive, are not only separable but are reversible so that when worn on one face they may be removed, turned over, and secured to the opposite side bar of the link.

It will be seen that I have described several ways by which the wearing block is held in position against the face of the side bar of the link and against the possibility of turning about the single securing bolt; and that one or two, or all of the ways shown, may be used in connection with any single block. One manner of holding the block in place is by causing it to straddle and engage with a web 5 of the chain; another is by causing its end to engage with some rigid part of the chain, such as a wing 4, which an end of the block is shaped to fit; while a third way is by providing the block with a flange that engages with the edge of the side bar. By making the blocks separable as described they may be applied to a chain when it is used in conveying materials that will rapidly cut out and wear the chain, and may be removed should the conveyer be used in connection with material of a non-abrasive nature.

What I claim and desire to secure by Letters Patent is:—

1. The combination with a drag conveyer chain, of a separable wearing block adapted to be applied to a link of the chain, of harder material than that of which the chain links are formed, and means for detachably securing the block to a link.

2. The combination with a drag conveyer chain, of a separable wearing block adapted to be applied to the side bar of a link of the chain, a bolt for securing the block to the side bar, and means for holding the block fixed in line with the side bar.

3. The combination with a drag conveyer chain, of a separable wearing block adapted to be applied to the side bar of a link of the chain, a bolt that passes through the side bar and the block for separably uniting the latter to the former, the block being shaped to so engage with the link as to be held in line with the side bar when bolted in place.

4. The combination with a drag conveyer chain the side bars of the links of which are formed with webs, of wearing blocks shaped to straddle the webs of the links and bolts for fastening the blocks to the side bars of the links.

GUSTAV R. RODDY.